US011604622B1

(12) United States Patent
Guo et al.

(10) Patent No.: US 11,604,622 B1
(45) Date of Patent: Mar. 14, 2023

(54) SELECTING AUDIO CLIPS FOR INCLUSION IN CONTENT ITEMS

(71) Applicant: Meta Platforms, Inc., Menlo Park, CA (US)

(72) Inventors: Dong Guo, Jersey City, NJ (US); Hao Huang, Pleasanton, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 29 days.

(21) Appl. No.: 17/308,852

(22) Filed: May 5, 2021

Related U.S. Application Data

(60) Provisional application No. 63/032,891, filed on Jun. 1, 2020.

(51) Int. Cl.
| | |
|---|---|
| *G06F 3/16* | (2006.01) |
| *G10L 25/18* | (2013.01) |
| *G10L 25/51* | (2013.01) |
| *G06N 20/00* | (2019.01) |
| *G06N 7/00* | (2023.01) |
| *G06F 3/04847* | (2022.01) |
| *H04L 67/306* | (2022.01) |

(52) U.S. Cl.
CPC .......... *G06F 3/165* (2013.01); *G06F 3/04847* (2013.01); *G06N 7/005* (2013.01); *G06N 20/00* (2019.01); *G10L 25/18* (2013.01); *G10L 25/51* (2013.01); *G10H 2210/076* (2013.01); *H04L 67/306* (2013.01)

(58) Field of Classification Search
CPC .................................. G06F 3/165; G06F 3/16
See application file for complete search history.

(56) References Cited

U.S. PATENT DOCUMENTS

| | | | |
|---|---|---|---|
| 9,313,593 B2* | 4/2016 | Resch | H04R 29/00 |
| 9,990,911 B1* | 6/2018 | Lee | G06F 16/683 |
| 10,025,786 B2* | 7/2018 | Jehan | G06F 16/41 |
| 2014/0338515 A1* | 11/2014 | Sheffer | G10H 1/0008 84/609 |
| 2017/0092323 A1* | 3/2017 | Goldman | G11B 27/34 |
| 2020/0013379 A1* | 1/2020 | Vaucher | G11B 27/031 |
| 2020/0074982 A1* | 3/2020 | McCallum | G10L 15/16 |
| 2021/0326102 A1* | 10/2021 | Morsy | G10L 21/0316 |

* cited by examiner

*Primary Examiner* — Olisa Anwah
(74) *Attorney, Agent, or Firm* — Lee & Hayes, P.C.

(57) ABSTRACT

Techniques for selecting portions of audio tracks for content item inclusion are described. For example, a social networking system may receive, from an audio producer, an audio track. In some examples, the social networking system may, using a machine-learned model, determine a first portion of the audio track having a change of frequency over time, and provide the first portion of the audio track to a first user for inclusion in a content item. In some cases, the social networking system may receive a selection of a second portion of the audio track. Based on the selection of the second portion of the audio track, the social networking system may modify the parameters of the machine-learned model to provide the second portion of the audio track to a second user.

20 Claims, 6 Drawing Sheets

SELECTING AUDIO CLIPS FOR INCLUSION IN CONTENT ITEMS

This application claims the benefit of priority to U.S. Provisional Application No. 63/032,891, filed Jun. 1, 2020, which is incorporated herein by reference.

BACKGROUND

Social networking systems allow users to share content with one another. Users may share content such as images, audio, video, text, and other content types. Often, users may wish to add audio to customize content items to be shared on the social networking systems. However, functionality is often limited within the social networking systems for users to include audio in customized content items.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
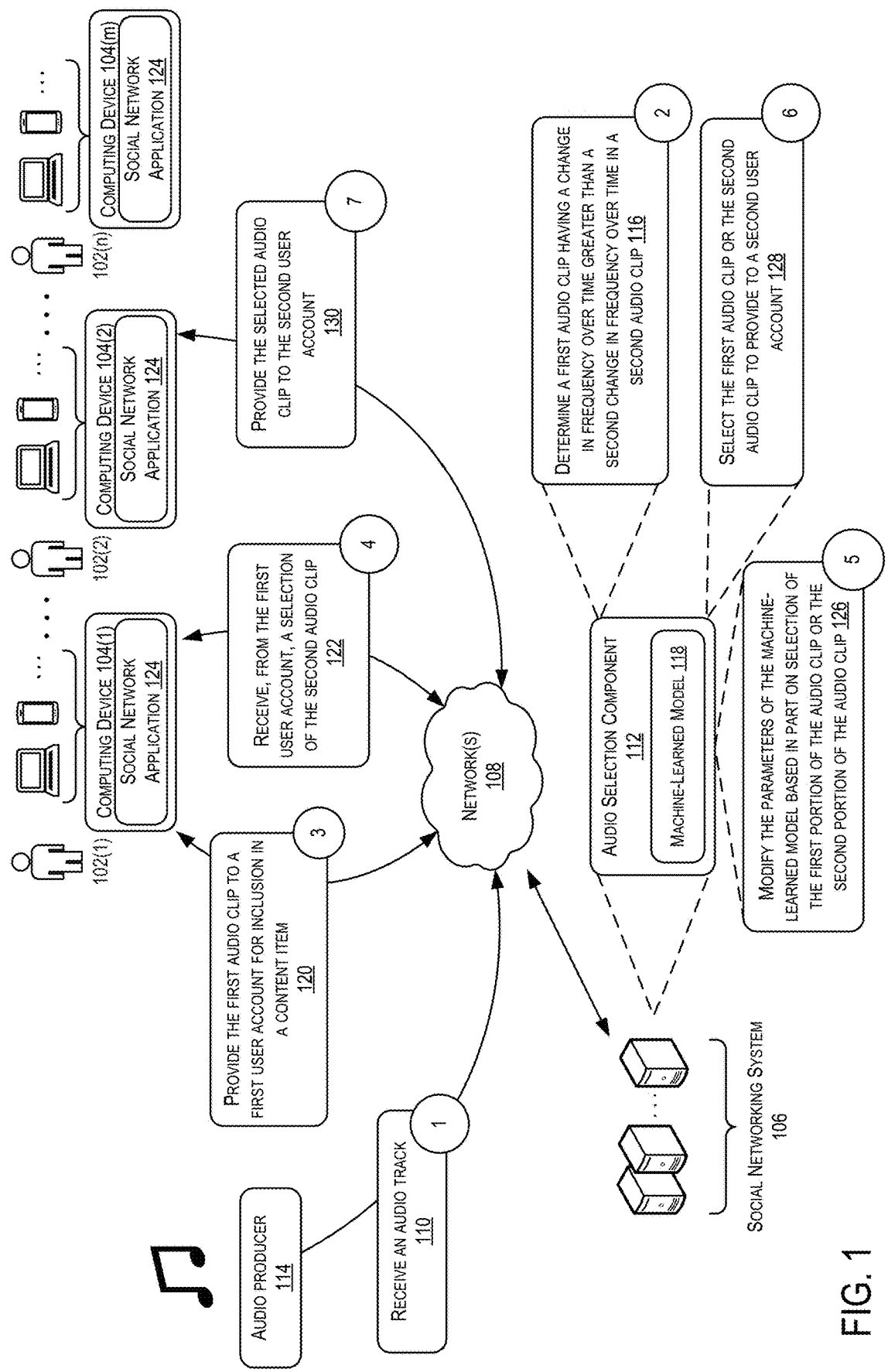
FIG. 1 is a schematic view of an example system usable to implement example techniques for selecting audio tracks to be included in content items to be shared with users via a social networking system.

While some conventional audio producers provide social networking systems with portions of audio tracks (e.g., audio clips) that users may include in content items, this system is not without limitations. In some cases, conventional social networking systems may rely on audio producers to identify a portion of the audio track (e.g., audio clip, music snippet, music clip, etc.) to be included in content items. However, many audio producers in conventional systems designate a set time in audio tracks to provide to social networking systems, such as one minute into an audio track, without regard for the audio content within the audio track. Users of conventional social networking systems are therefore often provided random and/or undesirable portions of audio tracks for inclusion in content items. This application describes techniques that provide functionality beyond what is provided in conventional social networking systems by determining desirable portions of an audio track for inclusion in content items based on audio content of the audio track. In some examples, the techniques may additionally or alternatively take user feedback into account to refine models used to determine the desirable portions of the audio tracks.

This application describes techniques for selecting and providing portions of audio tracks for inclusion in content items by a social networking system. As described in more detail below, the social networking system may determine which portion of an audio track is a desirable portion for users to include in content items and, in some instances, may update which portions of the audio track are deemed desirable based at least in part on user feedback.

For instance, in one example, a social networking system may operate a service that corresponds to a dedicated application installed on a user device. The social networking system may enable users to share content via the application installed on the user device. In some cases, the shared content may be accessed (e.g., viewed) by devices associated with other users that also have the application installed on their respective devices. Alternatively or additionally, the social networking system may enable users to share content, and/or access (e.g., view) content shared by other user accounts, via a web-based application accessed via a web browser. The social networking system may store account information associated with each user and the respective device on which the application is installed.

In some examples, the social networking system may receive, from an audio producer, an audio track. The audio producer may include any business, individual artist, or group of artists that creates, produces, records, distributes, and/or sells audio tracks. In some cases, the audio track may include a song, a voice recording, an audio book, and/or a sound clip, to name a few nonlimiting examples. The social networking system may, in some examples, input the audio track into a machine-learned model. The machine-learned model may be trained to identify a desirable portion of the audio track (e.g., a desirable audio clip). In some examples, the machine-learned model may analyze a rhythm associated with the audio track to identify beat times. In such examples, for each beat time, the machine-learned model may predict a popularity probability that an audio clip starting at the beat time will be favored by users when selecting background music for a content item. Based on the popularity probabilities associated with each beat time, the machine-learned model selects K distinct audio clips with top K popularity probabilities for recommending to users. In some examples, the audio clips with the highest popularity probabilities are audio clips of an audio track that are associated with a chorus or a hook of the audio track.

In some examples, the machine learned model may be configured to determine the popularity probability based at least in part on a change in frequency associated with an audio clip. A change in frequency over time that is greater than changes in frequency in other audio clips of an audio track, for example, may indicate that an audio clip is a desirable portion. An audio clip that has a change in frequency greater than other audio clips may indicate the chorus or the hook of a song, which may be desirable to include in a content item. Other audio clips that may be desirable to include in a content item and may be indicated by change in frequency over time may include an introduction of the song, a conclusion of the song, a sound effect or instrumental included in an audio track, an audio clip with laughter, and so forth. As used herein, the change in frequency may refer to a periodic vibrating property associated with the audio track.

In some examples, the social networking system may receive, from the machine learned model, a first audio clip of an audio track having a first popularity probability, the first popularity probability being greater than a second popularity probability associated with a second audio clip of the audio track, the second audio clip being different from the first audio clip. The social networking system may then provide the first audio clip (e.g., first portion of the audio track) to a user account of the social networking system for inclusion in a content item. The content item may include images and/or video which may be captured on a computing device and/or selected from device storage to share with other users. In some examples, the content item may include a predetermined duration (e.g., 15 seconds, 30 seconds, 45 seconds, etc.), such as a duration that is long enough to encompass at least some of the desirable audio clip. Additionally or alternatively, the first audio clip may be the duration of the content item and/or a customized duration that is less than or equal to a maximum duration permitted for content items by the social networking system. The first audio clip may be provided as a suggestion to the user of a desirable audio clip to include in the content item. In this way, users may easily add audio customization to content items using desirable audio clips, without having to spend time to search through the audio track to locate a desirable portion.

In some examples, the social networking system may further determine first characteristics associated with the first audio clip and second characteristics associated with the second audio clip. In some cases, the social networking system may then determine, based at least in part on the second characteristics being within a threshold difference of the first characteristics, that the second audio clip is a substantial duplicate occurrence of the first audio clip. For example, the substantial duplicate occurrence may be a repeat of a chorus of a song occurring at a different time in the song. In some examples, the social networking system may receive, from the machine-learned model, a third audio clip having third characteristics. The social networking system may determine, based on a determination that the third characteristics exceed the threshold difference from the first characteristics, that the third audio clip is distinct from the first audio clip. For example, the third audio clip that is distinct from the first audio clip may be a bridge of the audio track that occurs between the first audio clip and the second audio clip. The social networking system may then provide, based at least in part in the third audio clip being distinct from the first audio clip, the third audio clip to the user account. In this way, the social networking system may recognize when an audio clip substantially repeats itself and provide variety in audio clips as suggestions to be included in content items.

In some examples, the social networking system may further receive, from the user account, a selection of the second audio clip for inclusion in the content item. In some examples, the second audio clip is different than the first audio clip provided as a suggestion to be included in the content item by the social networking system. Thus, users may select an audio clip other than that provided by the social networking system.

In some examples, the social networking system may further determine a time at which a beat occurs in the audio track. A beat may be, for example, a basic unit of measure for an audio track. For example, the beat may be a rhythm that listeners typically tap their toes to when listening to music. In some examples, the social networking system may input, into the machine-learned model, a time at which the beat occurs in the audio track. In some examples, the machine-learned model may be configured to analyze frequencies, rhythms, and/or the like in the audio track for a first period of time before the beat occurs and for a second period of time after the beat occurs in the audio track. In this way, the machine-learned model may be configured to analyze the audio track for a first period of time before the time at which the beat occurs and for a second period of time after the beat occurs in the audio track to determine a popularity probability associated with the beat.

In some examples, the machine learned model may be configured to determine a popularity probability associated with an audio clip of the audio track based at least in part on a spectrogram graph associated with the audio track. In some examples, popularity probability may be based at least in part on a tempo or an amplitude associated with the audio clip. Tempo may be defined as a number of beats included in each minute of an audio track. For example, an audio track with a faster tempo may include a larger number of beats included in each minute of the audio track, whereas an audio track with a slower tempo may include a smaller number of beats included in each minute of the audio track. The amplitude may be defined as a measure of how loud the audio track is perceived to be.

In some examples, the social networking system may determine a number of content items that include the audio track. Then, the social networking system may determine that the number of content items that include the audio track is greater than a threshold number of content items (e.g., 25 content items, 50 content items, 100 content items, 1,000 content items, etc.). Based on determining that the number of content items that include the audio track is greater than the threshold number of content items, the social networking system may provide the first audio clip to the user account. In this way, social networking system may determine which audio clip to suggest to users based on feedback provided by users who have incorporated audio clips into content items.

In some examples, the social networking system may adjust the parameters of the machine-learned model, based on feedback from users, to suggest a different audio clip to users. For example, the social networking system may receive, from an audio producer, an audio track as described above. In some cases, the social networking system may provide a first audio clip to a a first user account of the social networking system for inclusion in a content item. The social networking system may then receive, from the first user account, a selection of a second audio clip, the second audio clip being different from the first audio clip. In some cases, the social networking system may modify parameters of the machine-learned model based at least in part on the selection of the second audio clip. For example, the selection of the second audio clip by the first user may provide an indication that the second audio clip is more desirable to be included in content items than the first audio clip. The social networking system may then select the first audio clip or the second audio clip to provide to a second user account. In some examples, the social networking system may select the first audio clip or the second audio clip to provide to the user account based in part on the modified parameters of the machine-learned model. The social networking system may then provide the selected audio clip to the second user account. In this way, the social networking system may consider user feedback to further update and refine the machine-learned model to provide users with desirable audio clips for use in content items.

In some examples, the selection is one of multiple selections received from multiple user accounts. In some cases, the social networking system may further determine audio clips associated with the multiple selections. Modifying the parameters of the machine-learned model may be further based on the audio clips associated with the multiple selections. In this way, the audio clip that is most frequently selected by users of the social networking system can be provided to other users to include in content items.

In some examples, the selection of the second audio clip is one of multiple selections received from multiple user accounts. The social networking system may then determine that the multiple selections of the second audio clip is greater than a threshold number of selections (e.g. 25 selections, 50 selections, 100 selections, 1,000 selections, etc.). In some examples, the social networking system may provide, as the selected portion and based at least in part on determining that the multiple selections of the second audio clip is greater than the threshold number of selections, the second audio clip to the second user account. In some cases, the threshold number of selections may be large enough to indicate that the selected audio clip is in fact a desirable portion. For example, an audio clip selected to be included in content items 100,000 times may be more likely to be a desirable audio clip than another audio clip selected to be included in content items 100 times. Thus, the social networking system may determine that an audio clip is a desirable portion based on more than a threshold number of users selecting the second p audio clip to be included in content items. In this way, the social networking system may avoid changing which audio clip is suggested to users when relatively small numbers of users (e.g., 1 user, 10 users, 100 users, etc.) select different audio clips to include in content items.

In some examples, the first audio clip may have a first change in frequency over time and the second audio clip may have a second change in frequency over time. In some cases, the first change in frequency may be different than the second change in frequency. The social networking system may determine, based at least in part in the second audio clip having a second change in frequency that is different from the first change in frequency of the first audio clip, that the second audio clip is distinct from the first audio clip. Providing the selected audio clip to the second user account may, for example, further be based on determining that the second audio clip is distinct from the first audio clip. For example, the audio track may include repeating audio clip, such as a chorus of a song. Thus, the social networking system may provide audio clip as suggestions to include in a content item that have different audio characteristics, rather than providing instances of similar portions.

In some examples, the social networking system may determine a first frequency associated with the first audio clip and a second frequency associated with the second audio clip. Frequency may be, for example, a measure of how high or low a pitch of an audio signal corresponding to each beat of the audio track. In some cases, the social networking system may determine that the first frequency associated with the first audio clip is greater than the second frequency associated with the second audio clip. The social networking system may provide the second audio clip to the second user based in part on the first frequency associated with the first audio clip being greater than the second frequency associated with the second audio clip. In some examples, the social networking system may determine the first frequency and the second frequency based on determining one or more of a change in tempo or a change in amplitude associated with respective audio clips.

In some examples, the parameters of the machine-learned model may be utilized to determine a popularity probability associated with an audio clip of the audio track based at least in part on a spectrogram associated with the audio track. In some examples, the social networking system may be configured to determine a time at which a beat occurs in an audio clip. In such examples, the machine learned model may be configured to analyze the audio track for a first period of time before the time at which the beat occurs and for a second period of time after the beat occurs in the audio track to determine a popularity probability associated with the beat.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to select portions of an audio track to be included in a content item via the system 100. In some examples, the system 100 may include users 102(1), 102(2), ... 102(n) (collectively "users 102") that interact using computing devices 104(1), 104(2), ... 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), wearable devices (e.g., augmented reality or virtual reality devices, glasses, watches, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via a social network application 124 operating on the respective the computing devices 104. The social networking system 106 may, with input from a user, create and store in the social networking system 106 a user account associated with the user. The user account may include demographic information, communication-channel information, financial information and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to select audio tracks to suggest to users to be included in content items to be shared between the users 102 via the computing devices 104.

For example, at operation 110 (indicated by "1"), an audio selection component 112 of the social networking system 106 may receive an audio track from an audio producer 114. The audio producer 114 may include, for example, any business, individual artist, or group of artists that creates, produces, records, distributes, and/or sells audio tracks. The audio track may include a song, a voice recording, an audio book, and/or a soundtrack, to name a few nonlimiting examples. Further, the audio track may include one or more beats. For the purpose of this application, a beat is defined as a basic unit of measure for an audio track. For example, the beat may be a rhythm that listeners typically tap their toes to when listening to music. Additionally or alternatively, the one or more beats may have one or more frequencies, where frequency may be a measure of how high or low a pitch of an audio signal corresponding to each beat is. For example, a deep bass sound may have a lower frequency, where a shrill, sharp sound may have a higher frequency.

In some examples, the audio selection component 112 may create a visual representation of one or more frequencies of the audio track over a duration of the audio track. For example, the audio selection component 112 may use spectrogram feature extraction, which may include determining the frequency of one or more audio signals within an audio track. After receiving the audio track, the audio selection component 112 may divide the audio track into small periods of time (e.g., 10 milliseconds, 20 milliseconds, 30 milliseconds, etc.). The audio selection component 112 may apply a Fourier transform (e.g., fast Fourier transform, discrete Fourier transform, etc.) to each period of time to determine amplitudes of the one or more frequencies within the duration of the audio track.

The one or more frequencies and/or amplitudes of the audio track may be presented as a spectrogram. The spectrogram may be represented as a two-dimensional plot, where time may be displayed on the x-axis and frequency of the audio track may be displayed on the y-axis of the plot. In some cases, the spectrogram may include a third dimension, where the amplitude of the frequency at a particular time within the duration of the audio track is indicated by color (not shown). For example, lower amplitudes may be indicated by dark colors, where higher amplitudes may be indicated by light colors.

At operation 116 (as indicated by a "2"), the audio selection component 112 may determine a first portion of the audio track (e.g., audio clip) having a first change in frequency over time. In various examples, the audio selection component 112 may be configured to pre-process the audio track and input the processed audio track into a machine-learned model 118. In some examples, the pre-processing may include identifying a beat rate (e.g., beats per second, beats per minute, etc.) associated with the audio track. For example, a pop music audio track may include a beat rate of 2 beats per second, or one beat every 0.5 seconds, though this is merely for an example and is not intended to be so limiting. In various examples, each beat in the audio track may be associated with an audio clip that starts at a respective beat time. For example, a first beat time at time 0 seconds (e.g., a beginning) of the audio track may have an associated first audio clip, a second beat time at time 0.5 seconds of the audio track may have an associated second audio clip, and so on.

In various examples, consecutive beat times may have overlapping audio clips. Continuing the example from above, a first audio clip starting at the first beat (0 seconds) may be 1.5 seconds long and may overlap the second audio clip that starts at the second beat (e.g., 0.5 seconds). In various examples, the audio selection component 112 may determine a feature associated with each audio clip. The feature can include a quantitative representation of information in a particular audio clip (e.g., change in frequency, rhythm, composition, tempo, etc.).

In some examples, the audio selection component 112 may input the spectrogram representation of the audio track into a machine-learned model 118 to identify a first portion of the audio track having a first change in frequency greater than a second change in frequency over time in a second portion of the audio track other than the first portion of the audio track. In some examples, the machine-learned model 118 may analyze changes in frequency over time, rhythm, composition, tempo, and/or the like associated with the audio track to identify a popularity probability of the audio clip. In at least one example, the changes in frequency over time, the rhythm, the composition, tempo, and/or the like of the audio track may represent a perceived amount of energy in the music. In such examples, the popularity probability associated with a particular audio clip may be based at least in part on the energy associated with the particular audio clip.

In some examples, the machine-learned model may predict a popularity probability that an audio clip starting at a beat time will be favored by users when selecting background music for a content item, such as based on the changes of frequency, the rhythm, the composition, the tempo, and/or the like. The audio clip may be associated with a portion of the spectrogram. Based on the popularity probabilities associated with each beat time and/or portion of the spectrogram, the machine-learned model selects K distinct audio clips with top K popularity probabilities for recommending to users. In some examples, the audio clips with the highest popularity probabilities are audio clips of an audio track that are associated with a chorus or a hook of the audio track, though other portions of the audio track are contemplated, such as an introduction of a song, a sound effect or instrumental included in an audio track, a portion of the audio track with laughter, and so forth. In some examples, the audio clips with the highest popularity probabilities may include the audio clips associated with one or more desirable portions of the audio track, such as for inclusion in one or more content items. The user may wish to include the desirable portion(s) of the audio track in the content item(s). In some examples, the content item(s) may include images and/or video which may be captured on a computing device 104 and/or selected previously from device storage to share with other users 104(*m*). For example, when creating a content item, a user may desire to add audio for additional customization.

Additionally or alternatively, the audio selection component 112 may be configured to directly input a raw audio track into the machine-learned model 118. In such examples, the machine-learned model 118 may be configured to transform the raw audio track into a spectrogram graph prior to determining the popularity probability associated with the audio track.

In some examples, the second portion of the audio track may be different than the first portion of the audio track. The second portion of the audio track may, for example, include a completely different segment of the audio track than the first portion of the audio track. Alternatively, the second portion of audio track may at least partially overlap the first portion of the audio track.

In some examples, the audio selection component 112 may limit a duration of content items shared on the social networking system 106, such as setting a maximum duration of 15 seconds, 30 seconds, 1 minute, 2 minutes, and so forth. Often times, audio tracks are not the same duration of the maximum duration for content items set by the social networking system 106. Therefore, the user may be limited to include a portion of an audio track that is shorter than the entire duration of the audio track in their content item.

In some cases, the machine-learned model 118 may be and/or include an image classifier trained to identify the desirable portion of the audio track from the spectrogram representation of the audio track. The image classifier, in some examples, may be a convolutional neural network trained to detect and compare changes in frequency over time. For example, the image classifier may determine that a first change in frequency in a first portion of the audio track is greater than a second change in frequency in a second portion of the audio track. The larger change in frequency may, for example, indicate that the first portion of the audio track may contain a desirable portion. Further, the machine-learned model 118 may be trained to output a probability that a portion of the audio track is a desirable portion. For example, the machine-learned model 118 may utilize training data including audio tracks having at least one desirable portion tagged indicating that a portion of the audio track is a desirable portion. Thus, when an audio track contains multiple changes in frequency, the machine-learned model 118 may predict which of those portions of the audio track containing changes in frequency are desirable portions.

In some examples, the machine-learned model 118 may detect one or more beats of the audio track. For example, the audio selection component 112 may divide the audio track into blocks of time (e.g., 10 milliseconds, 20 milliseconds, 30 milliseconds, etc.) to determine a frequency associated with each block. The audio selection component 112 may determine an average frequency associated with the blocks of time, and based on the average frequency, determine a frequency threshold. Additionally or alternatively, the audio selection component 112 may use a predetermined frequency threshold (e.g., greater than 400 hertz). Based on determining that the frequency of a block exceeds the threshold, the audio selection component 112 may determine that the block of the audio track contains one or more beats.

In some examples, the machine-learned model 118 may examine a period of time in which the one or more beats on the audio track occurs. The period of time may be before a detected beat (e.g., 1 second before, 2 seconds before, 3 seconds before, 4 seconds before, etc.) and/or after the detected beat (e.g., 2 seconds after, 4 seconds after, 6 seconds after, 8 seconds after, etc.). As an illustrative example, the machine-learned model 118 may examine the frequencies of the audio track in a twelve-second period of time around each beat detected in the audio track, such as 4 seconds prior to a beat and 8 seconds after the beat. The machine-learned model 118 may, for example, analyze the frequencies during the period of time to examine the changes in frequency within the twelve-second period of time, and determine which beat(s) are associated with a period of time having the largest change(s) in frequency.

At operation 120 (indicated by "3"), the audio selection component 112 may provide the first portion of the audio track to a first user 102(1) for inclusion in a content item. In some examples, the first portion of the audio track may be associated with a desirable portion of the audio track as determined by the machine-learned model 118. Further, the first portion of the audio track may be a predetermined duration (e.g., 15 seconds, 30 seconds, 45 seconds, etc.) such that it is long enough to encompass at least some of the desirable portion of the audio track. Additionally or alternatively, the first portion of the audio track may be the duration of the content item and/or a customized duration that is less than or equal to the maximum duration permitted for content items by the social networking system 106.

By providing the first portion of the audio track to a first user 102(1) using the described techniques, the social networking system 106 provides a suggestion of a desirable portion of an audio track to users which the users may then use to create content items. As mentioned above, audio producers in conventional systems often fail to provide social networking systems with portions of audio tracks to use in content items. In instances where the audio producers 114 do provide portions of audio tracks, the portions are often selected at a standard, designated time in the audio tracks, without regard for the content in the audio tracks. Thus, in instances in which users are provided portions of audio tracks, these portions are often random and/or undesirable for inclusion in content items. The audio selection component 112 described herein provides functionality beyond that which is provided in conventional social networking systems by providing users 102 with portions of the audio tracks that have been determined to be more likely to be desirable for inclusion in content items.

In some examples, the social networking system 106 may determine that the audio track may contain multiple portions which a user may find desirable, such as both a hook and a chorus. Thus, in some cases, the social networking system 106 may provide users with multiple portions of the audio track for inclusion in a content item. For example, the social networking system 106 may determine a second portion of the audio track having a second change in frequency over time that is different from the change in frequency over time of the first portion of the audio track. Then, the social networking system 106 may determine that the first change in frequency over time (associated with the first portion of the audio track) and the second change in frequency over time each exceed a threshold change in frequency over time, as described herein. The social networking system 106 may then provide, based at least in part on determining that the first portion of the audio track and the second portion of the audio track have changes in frequency over time greater than the threshold change in frequency, the first portion of the audio track and the second portion of the audio track to the user.

At operation 122 (as indicated by "4"), the audio selection component 112 may receive, from the first user 102(1), a selection of the second portion of the audio track. For example, the first user 102(1) may decide to use a different portion of the audio track in a content item than the first portion of the audio track provided by the social networking system 106. In some examples, the second portion of the audio track may be different than the first portion of the audio track. The second portion of the audio track may, for example, include a completely different segment of the audio track than the first portion of the audio track. Alternatively, the second portion of audio track may at least partially overlap the first portion of the audio track. Further, the second portion of the audio track may, similar to the first portion of the audio track, be a predetermined duration (e.g., 15 seconds, 30, seconds, 45 seconds, etc.). Additionally or alternatively, the second audio clip (e.g., second portion of the audio track) may be the duration of the content item and/or a customized duration that is less than the maximum duration permitted for content items by the social networking system 106.

At operation 126 (as indicated by a "5"), the audio selection component 112 may modify the parameters of the machine-learned model 118 based in part on the selection of the second portion of the audio track by the first user 102(1). For example, the selection of the second portion of the audio track by the first user 102(1) may provide an indication that the second portion of the audio track is more desirable to be included in content items than the first portion of the audio track. Thus, the machine-learned model 118 may adjust the parameters of the model such that the second portion of the audio track is afforded a greater probability of being the desirable portion of the audio track.

In other words, the audio selection component 112 may employ user feedback to modify the parameters of the machine-learned model 118. For example, selection of the second portion of the audio track by the users 102 may increase the likelihood that the second portion of the audio track will be provided to subsequent users. In this way, when a greater number of users provide feedback for a particular audio track, the machine-learned model 118 may "learn" which portions of a particular audio track and/or characteristics of audio tracks in general are more desirable to be included in content items.

At operation 128 (as indicated by a "6"), the audio selection component 112 may select the first portion of the audio track or the second portion of the audio track to provide to a second user 102(2) (e.g., a user account associated with the social network application installed on the computing device 104(2)). In some examples, the machine-learned model 118 may determine which portion of the audio track to provide to the second user 102(2) based in part on a number of times the second portion of the audio track has been selected by one or more other users 102(m). For example, the audio selection component 112 may utilize a threshold number of selections of the second portion of the audio track (e.g. 25 selections, 50 selections, 100 selections, 1,000 selections, etc.) to determine whether to provide the second portion of the audio track to the users 102 as a suggestion to be included in a content item. In this way, the audio selection component 112 may adjust which portion of an audio track is suggested to users to be included in a content item based on feedback provided by users who have already incorporated portions of the audio track into content items.

At operation 130 (as indicated by a "7"), the audio selection component 112 may provide the selected portion of the audio track to the second user 102(2) as a suggestion to be included in a content item. Similar to the operation 120, the second user 102(2) may include the selected portion of the audio track in a content item to be shared on the social network application 124 with other users 102(n). Alternatively or additionally, the second user 102(2) may select a different portion of the audio track than the second portion to be included in the content item. In some examples, similar to the operation 128, the selection of the second portion of the audio track and/or a different portion of the audio track than the second portion selected by the first user 102(1) may be used to further refine the parameters of the machine-learned model 118. For example, the selection of the different portion of the audio track other than the second portion of the audio track by the first user 102(1) may provide an indication that the different portion of the audio track is more desirable to be included in content items than the second portion of the audio track. Thus, the machine-learned model 118 may adjust the parameters of the model such that the different portion of the audio track chosen is afforded a greater probability of being the desirable portion of the audio track.

Although specific machine-learned models are described above, other types of machine-learned models can additionally or alternatively be used. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In some examples, the audio selection component 112 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the audio selection component 112 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the audio selection component 112 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the audio selection component 112 may be authorization/privacy servers for enforcing privacy settings. In response to a request from the user 102(1) (or other entity) for a particular object stored in a data store, the audio selection component 112 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the audio selection component 112 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the audio selection component 112 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The audio selection component 112 may access such information in order to provide a particular function or service to the user 102(1), without the social networking system 106 having access to that information for any other purposes. Before accessing, storing, or using such objects or information, the audio selection component 112 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the audio selection component 112 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The audio selection component 112 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the audio selection component 112 may use location information provided from the computing device 104(1) of the user 102(1) to provide the location-based services, but that the audio selection component 112 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the audio selection component 112 may be restricted in its access, storage, or use of the objects or information. The audio selection component 112 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the audio selection component 112 may temporarily store the message in a data store until the user 102(2) has viewed or downloaded the message, at which point the audio selection component 112 may delete the message from the data store. In some examples, continuing with the prior example, the message may be stored for a specified period of time (e.g., 2 weeks), after which point the audio selection component 112 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The audio selection component 112 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the audio selection component 112 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the audio selection component 112 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the audio selection component 112 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the audio selection component 112 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the audio selection component 112 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the audio selection component 112 may send a reminder to the user to confirm his or her privacy settings every six months or after every ten photo posts. In particular examples, privacy settings may also allow users to control access to the objects or information on a per-request basis. As an example and not by way of limitation, the audio selection component 112 may notify the user whenever a third-party system attempts to access information associated with the user and require the user to provide verification that access should be allowed before proceeding.

Figure 2:
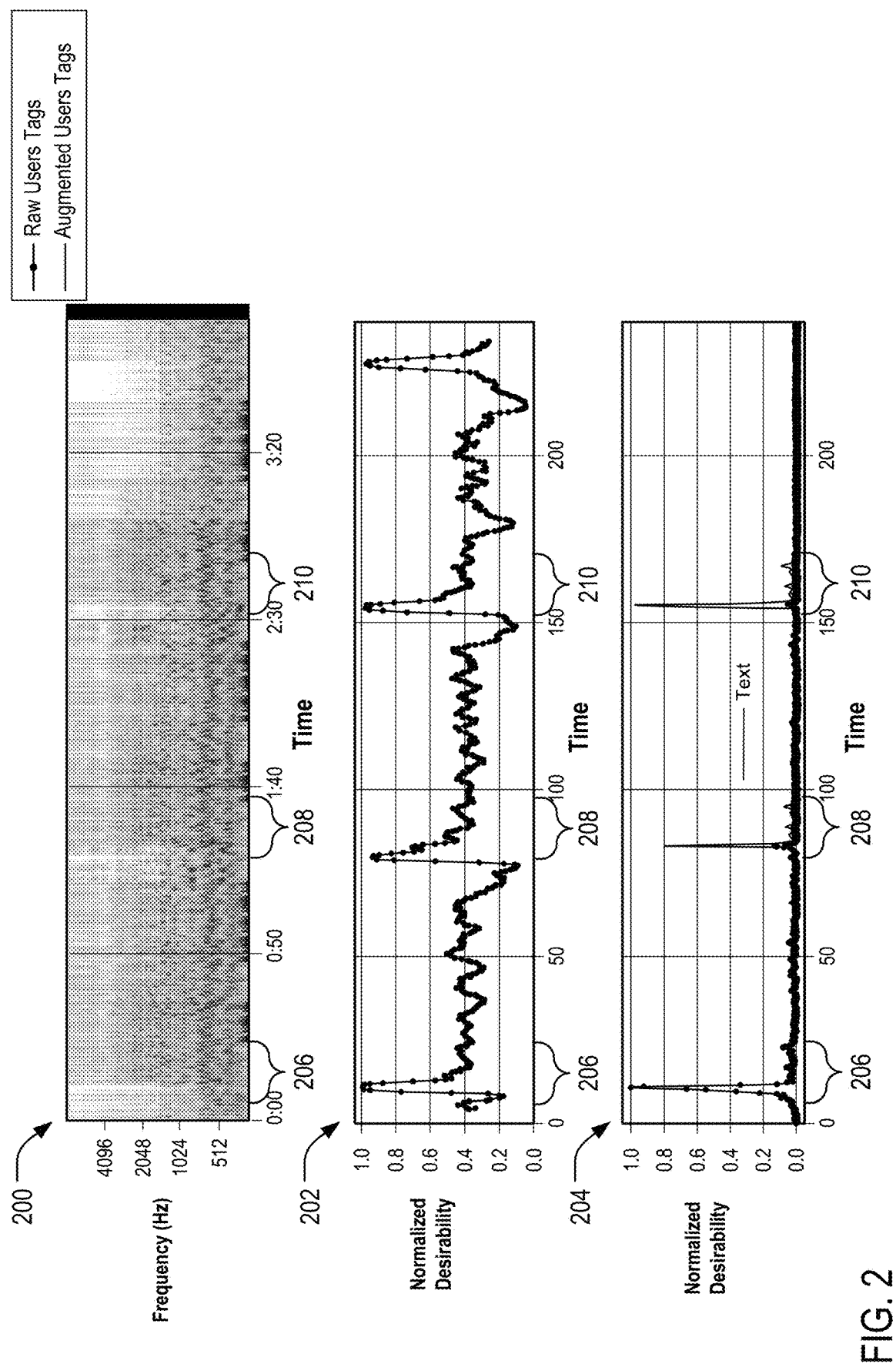
FIG. 2 illustrates examples of charts that illustrate normalized desirability throughout an audio track and frequency of sound included in an audio track, according to techniques described herein.

FIG. 2 illustrates an example spectrogram 200 associated with an audio track, an example of a chart 202 of predicted popularity of audio clips corresponding to the audio track, and an example of a chart 204 associated with one or more actual user selections of audio clips. The spectrogram 200 illustrates the frequency, in Hertz (Hz) of the audio track on the y-axis over time on the x-axis. For example, upon receiving an audio track, the audio selection component 112 may create a visual representation of the one or more frequencies of the audio track. In some examples, the spectrogram may be represented as a multi-dimensional plot, where an amplitude of the frequency at a particular time within the duration of the audio track in indicated by color, or as represented in the spectrogram 200, shading. In some examples, higher frequencies may be indicated by a lighter color, while lower frequencies may be indicated by a darker color, or vice versa.

In some examples, the audio selection component 112 may input the spectrogram 200 associated with the audio track into the machine-learned model 118 to identify a popularity probability of one or more audio clips associated with the audio track, as described above. As discussed above, the popularity probability may be determined based on an analysis of the audio track at one or more beats thereof. As discussed above, the popularity probability may be determined based on an energy of each audio clip that starts at respective beat times. The energy can include a change in frequency over time, a rhythm, a composition, a tempo, or the like. For example, the audio selection component 112 may divide the audio track into blocks of time (e.g., 10 milliseconds, 20 milliseconds, 30 milliseconds, etc.) to determine a frequency associated with each block. The audio selection component 112 may determine an average frequency of each period of time and based in on part on the average frequency exceeding a frequency threshold, the audio selection component 112 may determine that the block includes one or more beats.

Once the audio selection component 112 has detected one or more beats of the audio track, the machine-learned model 118 may examine a period of time before a detected beat (e.g., 1 second before, 2 seconds before, 3 seconds before, 4 seconds before, etc.) and/or after the detected beat (e.g., 2 seconds after, 4 seconds after, 6 seconds after, 8 seconds after, etc.) to determine whether a change in frequency greater than a threshold change in frequency has occurred. In some cases, the portion of the audio track having a greater change in frequency may indicate a desirable portion of the audio track for inclusion in a content item.

In some examples, the audio selection component 112 may apply a log-Mel function to the spectrogram 200 to obtain the chart 202 corresponding to the spectrogram 200. For example, the chart 202 may depict a normalized desirability over time, where the normalized desirability is based on the change in frequency depicted in the spectrogram 200. In various examples, the normalized desirability may represent popularity probability of particular audio clips associated with the audio track. For example, the popularity probability of a first audio clip 206 may be a first value (illustrated as normalized desirability of 1.0), a popularity probability of a second audio clip 208 may be a second value (illustrated as normalized desirability of 0.95), and a popularity probability of a third audio clip 210 may be a third value (illustrated as normalized desirability of 0.99). In various examples, a greater change in frequency associated with respective audio clips may indicate a higher popularity probability (e.g., higher probability that the audio clip contains a desirable portion), which is reflected by a greater normalized desirability. The spectrogram 200 and the chart 202 illustrate that the first audio clip 206, the second audio clip 208, and the third audio clip 210 are associated with higher energies than other audio clips of the audio track (e.g., respective changes in frequency are greater than other changes associated with the other audio clips).

In the illustrative example, the frequencies associated with the first audio clip 206, the second audio clip 208, and the third audio clip 210 are substantially similar (e.g., within a threshold difference (e.g., within 0.05, 0.09, 1.3 normalized desirability), which may indicate that the first audio clip 206, the second audio clip 208, and the third audio clip 210 are substantial duplicate occurrences of the audio track (e.g., two instances of a chorus of a song, etc.). In some examples, a determination that different audio clips are substantial duplicate occurrences may be based at least in part on a similarity in characteristics of the audio clips (e.g., normalized desirability, change in frequencies over time, rhythm, composition, tempo, etc.). In some examples, the determination may be based on a determination that values associated with one or more characteristics each of the audio clips are within a threshold difference of the other audio clips.

In some examples, the audio selection component 112 may determine that the first audio clip 206 and the second audio clip 208 are substantial duplicate occurrences within the audio track (e.g., are substantially the same, within a threshold difference of one another, etc.). In some cases, the second audio clip 208 may include a second occurrence (or substantially similar duplicate) of the first audio clip 206, repeated at a time later in the audio track. For example, the substantial duplicate occurrence may be a repeat of a chorus of a song repeating later on in the song. Based in part on determining that the first audio clip 206 and the second audio clip 208 are substantial duplicates, the social networking system 106 may provide one of the first audio clip 206 or the second audio clip 208 to the user. In this way, the social networking system 106 may recognize when a portion of the audio track repeats itself and prevent substantially similar portions of the audio track being provided to the user 104 as suggestions to be included in a content item.

In various examples, the chart 204 may include a normalized desirability of audio clips that are determine based on actual user selections of audio clips associated with the audio track. As such, the chart 206 may represent an actual popularity associated with the audio clips. For example, the first audio clip 206 may be selected by different users the most, followed by the third audio clip, and the second audio clip 208, in that order, with other audio clips of the audio track being selected minimally (e.g., less than a threshold number of times) or not at all.

In some examples, the social networking system 106 may label an audio clip as "positive" or popular based on a determination that a number of users that have selected the audio clip is above a threshold number. For example, the first audio clip 206 may be selected a number of times greater than the threshold number. Based on the number of user selections being greater than the threshold number, the social networking system 106 may label or identify the first audio clip 206 as being "positive" or popular. In some examples, based on a determination that an audio clip is selected less than the threshold number of times, the social networking system 106 may label or identify the audio clip as "negative" or unpopular. In some examples, the social networking system 106 may determine to not present the negative audio clip to additional users for incorporation with a content item.

In various examples, the social networking system 106 may apply selection numbers to substantially similar occurrences of audio clips. In such examples, the social networking system 106 may be configured to prevent a mislabeling of a particular audio clip based on a location thereof within the audio track. For example, users may select the first audio clip 206 a first number of times that is above the threshold number, but may select the second audio clip 208, in the middle of the audio track, less than the threshold number of times. Thus, to prevent the second audio clip 208, which is substantially duplicate occurrence of the first audio clip 206, from being labeled as a negative or unpopular audio clip, the social networking system 106 may apply selection numbers associated with the first audio clip 206 to the second audio clip 208, thereby resulting in the second audio clip 208 being labeled or identified as a "positive" or popular audio clip. Chart 204 illustrates the processed or revised popularities associated with the first audio clip 206, the second audio clip 208, and the third audio clip 210.

In various examples, the machine-learned model 118 may determine, based on a comparison of chart 202 and 204, that the model prediction is or is not consistent with user activities. In various examples, the machine-learned model 118 may be configured to update one or more parameters of (e.g., re-train) the machine-learned model 118 based on actual user selections, such as based on the comparison. In other words, the machine-learned model 118 can be trained based on the actual user selections, such as to provide a more accurate determination of popularity probability.

In the illustrative example, the model prediction is consistent with user activities. In other examples, a difference between apexes and associated normalized desirability measures between the chart 202 and the chart 204 may represent that the model prediction is not consistent with user activities. In such examples, the machine learned model 118 may utilize the comparison and/or data associated with the charts 202 and 204 to update the parameter(s) of and/or re-train the machine-learned model 118.

Figure 3:
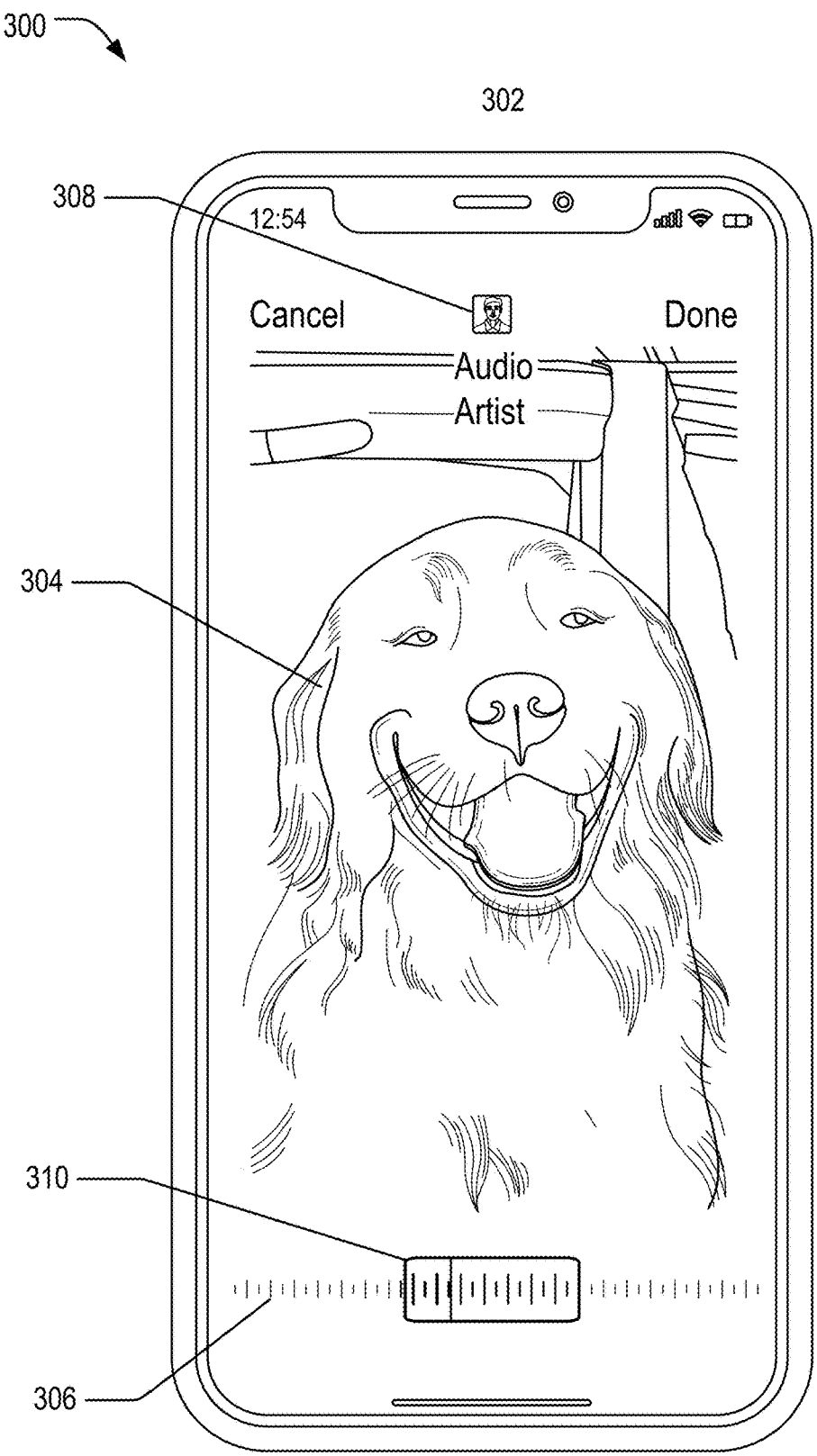
FIG. 3 illustrates an example user interface that is usable to select a portion of an audio track to include in a content item using the techniques described herein.

FIG. 3 illustrates an example device 300 including a user interface 302 which may be presented to one of the users 102 in accordance with selection of an audio clip to include in a content item 304. For example, user interface 302 may include a content item 304 and a visual representation 306 of an audio track for inclusion in the content item 304. In some examples, the visual representation 306 of the audio track may correspond to or represent the duration of the audio track, such that the far left end of the visual representation 306 may indicate the beginning of the audio track, and the far right end of the visual representation 306 may represent the end of the audio track. Additionally, the user interface 302 may include audio track information 308 such as, for example, a title of the audio track, a name of the artist and/or producer of the audio track, an album cover of the audio track, and/or an image of the artist of the audio track, to name a few non-limiting examples. In some examples, although not explicitly shown, other types of content items may include a portion of an audio track as well, such as feed posts, ephemeral content items, and the like.

In some examples, the user interface 302 may include an audio clip selection icon 310. The selection icon 310 may overlay at least a portion of the visual representation 306 to indicate a first portion of the audio track (e.g., first audio clip) to be included in the content item. For example, a selection icon positioned at the far-left side of the visual representation would indicate a selection of the beginning of the audio track for inclusion in the content item. In some examples, a size of the selection icon 310 may correspond to the duration of the content item.

In some examples, the first portion of the audio track may be selected by the social networking system 106 such that it includes a desirable portion of the audio track. For example, after receiving a selection an audio track to include in a content item, the social networking system 106 may determine which portion of the audio track is a desirable portion and provide that portion to the user 102. Thus, when creating a content item, the user 102 is saved the time and effort of searching through the duration of the audio track for the desirable portion.

In some examples, the user 102 may wish to include in the content item a second portion of the audio track (e.g., second audio clip) (not pictured). For example, the user 102 may, using a touch input, move the selection icon 310 such that it overlaps a different portion of the duration 306 of the audio track. In some examples, the second portion of the audio track may be different than the first portion of the audio track. For example, the second portion may include a completely different segment of the audio track than the first portion. Alternatively, the second portion of the audio track may at least partially overlap with the first portion of the audio track. In this way, the user 104 may further customize the content item by selecting exactly which portion of the audio track to include.

Figure 4:
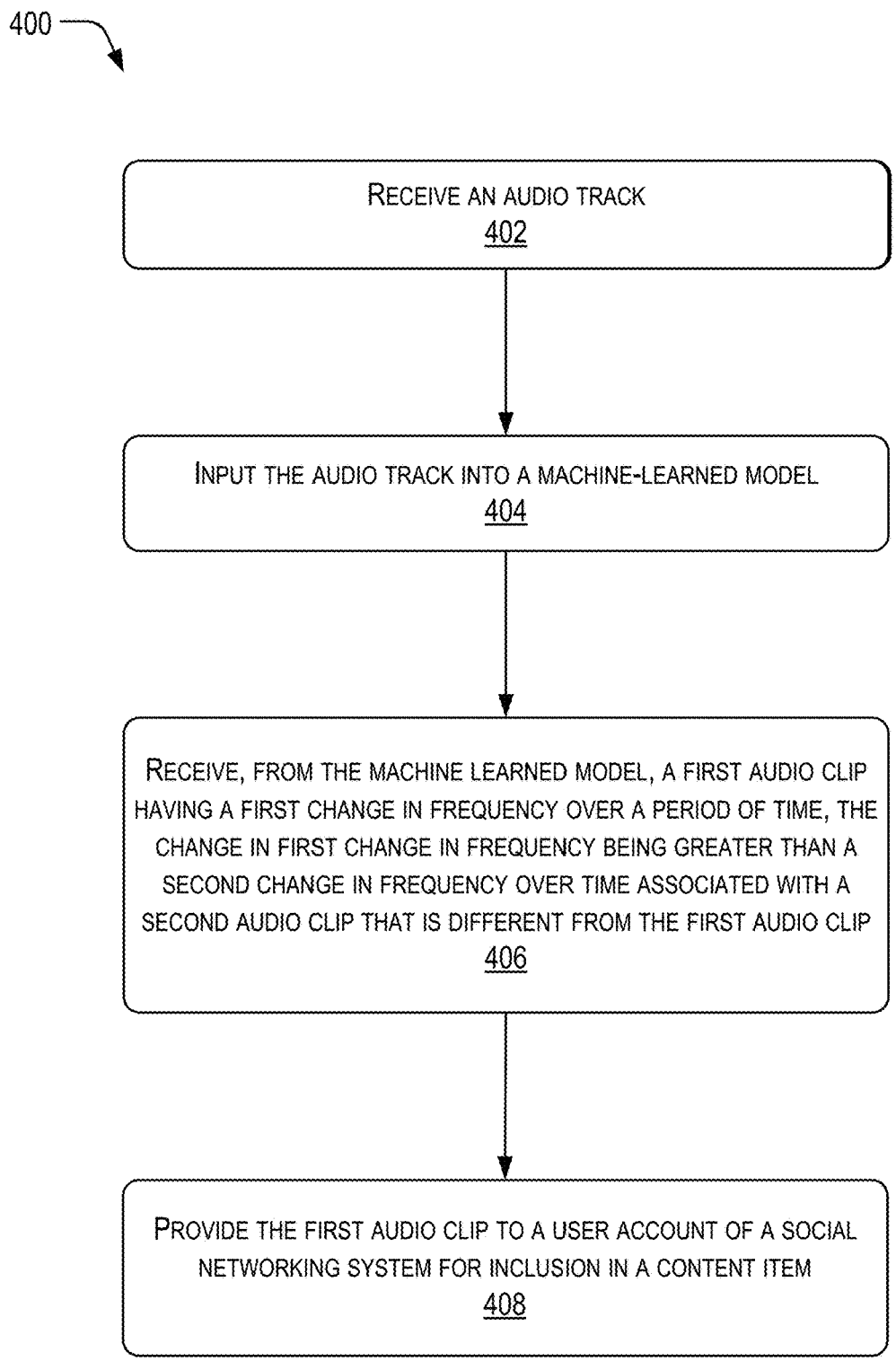
FIG. 4 illustrates a flowchart outlining an example method for selecting a portion of an audio track for inclusion in a content item using the techniques described herein.
Figure 5:
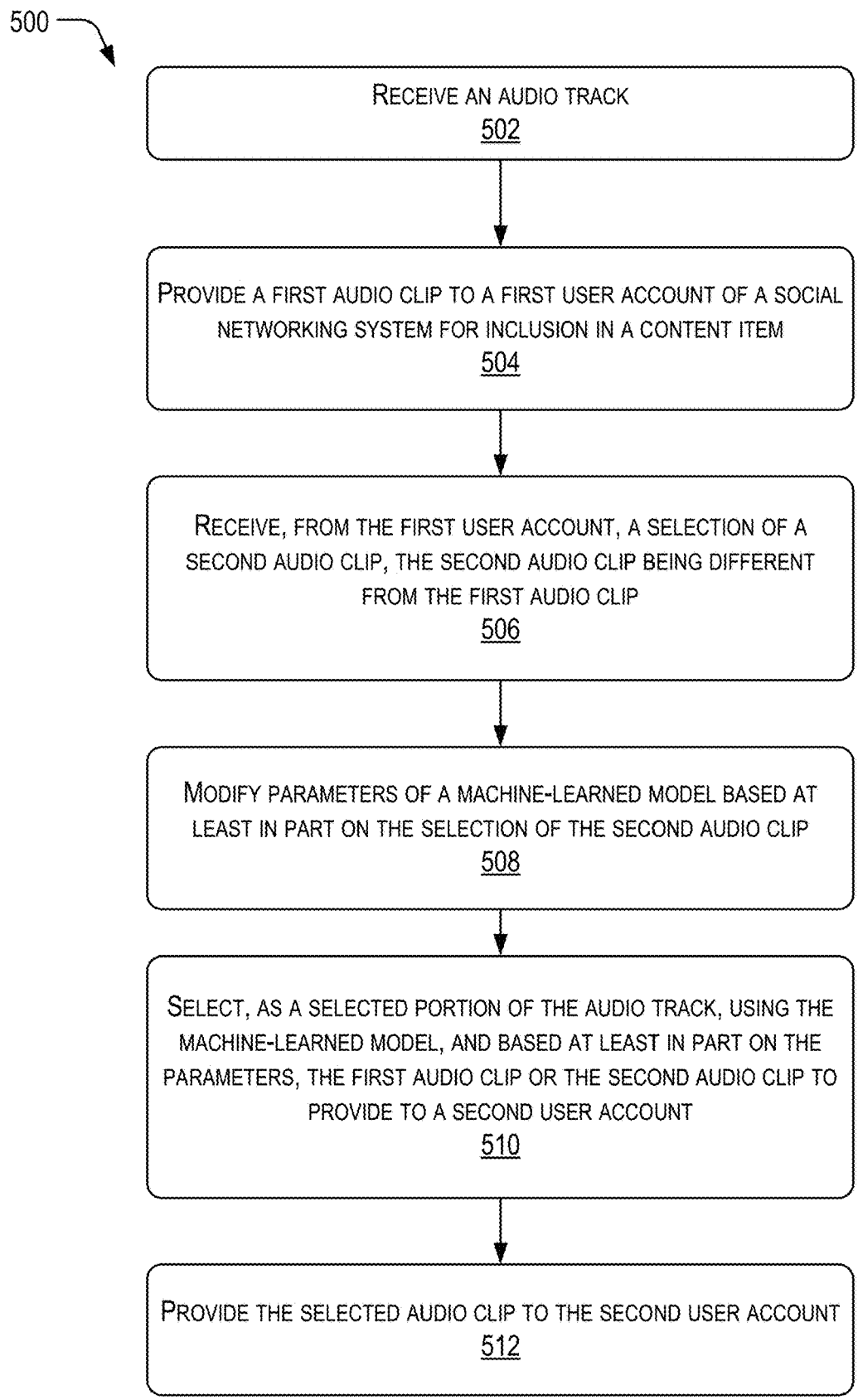
FIG. 5 illustrates an example process for identifying a portion of an audio track to include in a content item based on user feedback using the techniques described herein.

FIGS. 4 and 5 illustrate example processes for selecting portions of audio tracks for inclusion in a content item using the techniques described herein. The example processes 400 and 500 are described with reference to the examples of FIGS. 1, 2, 3, and/or 6 for convenience and ease of understanding. However, the example processes 400 and 500 are not limited to being performed using the systems of FIG. 1 and/or FIG. 6, and/or the user interface 300 of FIG. 3, and may be implemented using systems and devices other than those described herein.

The processes 400 and 500 described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some examples, one or more operations of the processes 400 and 500 may be combined with one another, and/or omitted entirely. Moreover, the processes 400 and 500 described herein can be combined in whole or in part with other methods.

FIG. 4 illustrates an example process 400 for identifying and providing a portion of an audio track for inclusion in a content item. Operation 402 includes receiving an audio track. In some examples, the audio track may be provided by an audio producer and may include a song, a voice recording, an audio book, and/or a soundtrack, for example. Operation 404 includes inputting the audio track into a machine-learned model. In some examples, the machine-learned model may be configured to identify a first portion of the audio track having a first change in frequency over time that is greater than a second change in frequency over time in a second portion of the audio track.

Operation 406 includes receiving, from the machine-learned model, a first portion of the audio track having a first change in frequency over time, where the first portion of the audio track is a predetermined duration. The first change of frequency may be, in some examples, greater than a second change in frequency over time in a second portion of the audio track other than the first portion of the audio track. A large change in frequency may, for example, indicate that a portion of the audio track is a desirable portion of the audio track. In some cases, the desirable portion of the audio track may be the chorus or the hook of a song, an introduction of the song, a conclusion of the song, a sound effect or instrumental included in an audio track, or a portion of an audio track with laughter, to name a few non-limiting examples. In examples, the predetermined duration (e.g., 15 seconds, 30 seconds, 45 seconds, etc.) may be long enough to encompass at least some of the desirable portion of the audio track. Additionally or alternatively, the first portion of the audio track may be the duration of the content item and/or a customized duration that is less than or equal to a maximum duration permitted for content items by the social networking system.

Operation 408 includes providing the first portion of the audio track to a user account of a social networking system for inclusion in a content item of the predetermined duration. The content item may, for example, include images and/or video which may be captured in a computing device and/or selected previously from device storage to share with other users. The portion of the audio track may be provided as a suggestion to the user to be included in the content item, where the suggestion is based on a likelihood that the portion of the audio track is a desirable portion and is a duration suitable for inclusion in the content item to be shared on the social networking system. In this way, users may customize content items using desirable portions of audio tracks.

FIG. 5 illustrates an example process for identifying a portion of an audio track to include in a content item based on user feedback using the techniques described herein. Operation 502 includes receiving an audio track. In some examples, the audio track may be provided by an audio producer and may include a song, a voice recording, an audio book, and/or a soundtrack, for example. Operation 504 includes providing a first portion of the audio track to a first user account of a social networking system for suggested inclusion in a content item. The content item may, for example, include images and/or video which may be captured by a computing device and/or selected previously from device storage to share with other users. In some examples, the first portion of the audio track provided as a suggestion to include in the content item may be a desirable portion of the audio track, such as the chorus or the hook of a song, an introduction of the song, a conclusion of the song, a sound effect or instrumental included in an audio track, or a portion of an audio track with laughter, to name a few non-limiting examples. Additionally, the first portion of the audio track may be a predetermined duration. For example, the predetermined duration (e.g., 15 seconds, 30 seconds, 45 seconds, etc.) may be long enough to encompass at least some of the desirable portion of the audio track. Further, the first portion of the audio track may be the duration of the content item and/or a customized duration that is less than or equal to a maximum duration permitted for content items by the social networking system.

Operation 506 includes receiving, from the first user account, a selection of a second portion of the audio track. In some examples, the second portion of the audio track may be different from the first portion of the audio track. The second portion of the audio track may, for example, include a completely different segment of the audio track than the first portion of the audio track. Alternatively, the second portion of audio track may at least partially overlap the first portion of the audio track.

Operation 508 includes modifying the parameters of a machine-learned model based at least in part on the selection of the second portion of the audio track. For example, the machine-learned model may adjust the parameters of the model such that the second portion of the audio track is given a greater probability of being a desirable portion of the audio track.

Operation 510 includes selecting, as a selected portion of the audio track using the machine-learned model and based at least in part on the parameters, the first portion of the audio track or the second portion of the audio track to provide to a second user account. For example, the machine-learned model may determine which portion of the audio track to provide to the second user account based in part on a number of times the second portion the audio track has been selected by one or more other users. Thus, the social networking system may consider user feedback to further update and refine the machine-learned model to provide users with desirable portions of audio tracks for use in content items.

Operation 512 includes providing the selected portion of the audio track to the second user account. In some examples, the second user may include the selected portion of the audio track to be included in a content item. Additionally, similar to operation 508, the selection of the selected portion of the audio track may be used to further refine the parameters of the machine-learned model.

Example System and Device

Figure 6:
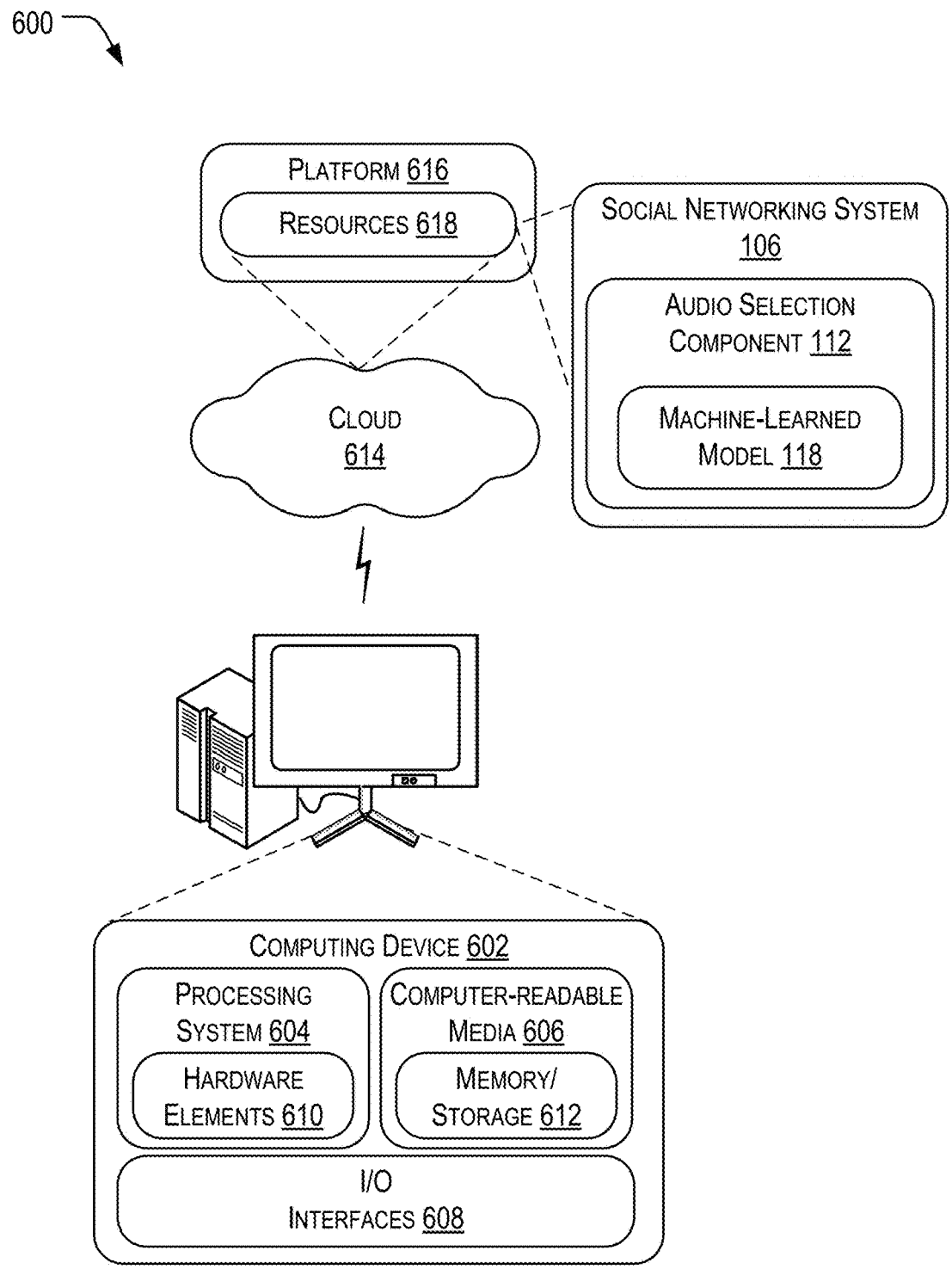
FIG. 6 is a schematic illustration of an example system and device usable to implement the techniques described herein.

FIG. 6 illustrates an example system generally at 600 that includes an example computing device 602 that is representative of one or more computing systems and/or devices that may implement the various techniques described herein. This is illustrated through inclusion of the audio selection component 112 and the machine-learned model 118. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage component 612. The memory/storage component 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 602. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 602, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 610 and computer-readable media 606 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also be scalable to provide a corresponding level of scale to encountered demand for the resources 618 that are implemented via the platform 616. Accordingly, in an interconnected device embodiment, implementation of functionality described herein may be distributed throughout multiple devices of the system 600. For example, the functionality may be implemented in part on the computing device 602 as well as via the platform 616 which may represent a computing environment or cloud 614.

The example systems and methods of the present disclosure overcome various deficiencies of known prior art devices. Other embodiments of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving an audio track;
inputting the audio track into a machine-learned model;
receiving, from the machine-learned model, a first audio clip of an audio track having a first popularity probability, the first popularity probability being greater than a second popularity probability associated with a second audio clip of the audio track, the second audio clip being different from the first audio clip;
determining a number of content items that include the audio track;
determining that the number of content items that include the audio track is greater than a threshold number; and
providing the first audio clip to a user account of a social networking system for inclusion in a content item,
wherein providing the first audio clip is further based on determining that the number of content items that include the audio track is greater than the threshold number.

2. The method of claim 1, further comprising:
determining first characteristics associated with the first audio clip and second characteristics associated with the second audio clip;
determining that the second characteristics of the second audio clip are within a threshold difference of the first characteristics of the first audio clip;
determining, based at least in part on the second characteristics being within the threshold difference of the first characteristics, that the second audio clip is a substantial duplicate occurrence of the first audio clip;
receiving, from the machine-learned model, a third audio clip having third characteristics;
determining that the third characteristics exceed the threshold difference from the first characteristics;
determining, based at least in part on the third characteristics exceeding the threshold difference, that the third audio clip is distinct from the first audio clip; and
providing, based at least in part on the third audio clip being distinct from the first audio clip, the third audio clip to the user account.

3. The method of claim 1, further comprising:
receiving, from the user account, a selection of the second audio clip for inclusion in the content item.

4. The method of claim 1, further comprising:
determining a time at which a beat occurs in the audio track,
wherein the machine-learned model is configured to analyze the audio track for a first period before the time at which the beat occurs and for a second period after the beat occurs in the audio track to determine a popularity probability associated with the beat.

5. The method of claim 1, wherein the machine-learned model is configured to determine a popularity probability associated with an audio clip of the audio track based at least in part on a spectrogram graph associated with the audio track.

6. One or more non-transitory computer-readable media storing instructions that, when executed by one or more processors, cause the one or more processors to perform operations comprising:
receiving an audio track;
providing a first audio clip to a first user account of a social networking system for inclusion in a content item;
receiving, from the first user account, a selection of a second audio clip, the second audio clip being different from the first audio clip;
modifying parameters of a machine-learned model based at least in part on the selection of the second audio clip;
selecting, as a selected portion of the audio track, using the machine-learned model and based at least in part on the parameters, the first audio clip or the second audio clip to provide to a second user account; and
providing the selected audio clip to the second user account.

7. The one or more non-transitory computer-readable media of claim 6, wherein the selection is one of multiple selections received from multiple user accounts, the operations further comprising:
determining audio clips associated with the multiple selections,
wherein modifying the parameters of the machine-learned model is further based on the audio clips associated with the multiple selections.

8. The one or more non-transitory computer-readable media of claim 6, wherein the selection of the second audio clip is one of multiple selections received from multiple user accounts, the operations further comprising:
determining that a number of selections of the multiple selections of the second audio clip is greater than a threshold number of selections; and
providing, as the selected audio clip and based at least in part on determining that the number of selections of the second audio clip is greater than the threshold number of selections, the second audio clip to the second user account.

9. The one or more non-transitory computer-readable media of claim 6, wherein the first audio clip has a first change in frequency over time and the second audio clip has a second change in frequency over time, the first change in frequency being different than the second change in frequency, the operations further comprising:
determining, based at least in part on the second audio clip having a second change in frequency that is different from the first change in frequency of the first audio clip, that the second audio clip is distinct from the first audio clip,
wherein providing the selected audio clip to the second user account is further based on determining that the second audio clip is distinct from the first audio clip.

10. The one or more non-transitory computer-readable media of claim 6, the operations further comprising:
  determining a first frequency associated with the first audio clip and a second frequency associated with the second audio clip; and
  determining that the first frequency audio clip is greater than the second frequency,
  wherein providing the selected audio clip to the second user account is further based on the first frequency being greater than the second frequency.

11. The one or more non-transitory computer-readable media of claim 10, wherein determining the first frequency and the second frequency includes determining one or more of a change in tempo or a change in amplitude associated with respective audio clips.

12. The one or more non-transitory computer-readable media of claim 6, wherein the parameters of the machine-learned model are utilized to determine a popularity probability associated with an audio clip of the audio track based at least in part on a spectrogram associated with the audio track.

13. The one or more non-transitory computer-readable media of claim 6, further comprising:
  determining a time at which a beat occurs in the audio clip,
  wherein the machine-learned model is configured to analyze the audio track for a first period before the time at which the beat occurs and for a second period after the beat occurs in the audio track to determine a popularity probability associated with the beat.

14. A system comprising:
  one or more processors; and
  one or more computer-readable media storing instructions that, when executed by the one or more processors, perform operations comprising:
    receiving an audio track;
    inputting the audio track into a machine-learned model;
    determining a time at which a beat occurs in the audio track,
    wherein the machine-learned model is configured to analyze the audio track for a first period before the time at which the beat occurs and for a second period after the beat occurs in the audio track to determine a popularity probability associated with the beat;
    receiving, from the machine-learned model, a first audio clip having a first popularity probability, the first popularity probability being greater than a second popularity probability associated with a second audio clip that is different from the first audio clip; and
    providing the first audio clip to a user account of a social networking system for inclusion in a content item.

15. The system of claim 14, the operations further comprising:
  determining first characteristics associated with the first audio clip and second characteristics associated with the second audio clip;
  determining that the second characteristics of the second audio clip are within a threshold difference of the first characteristics of the first audio clip;
  determining, based at least in part on the second characteristics being within the threshold difference of the first characteristics, that the second audio clip is a substantial duplicate occurrence of the first audio clip;
  receiving, from the machine-learned model, a third audio clip having third characteristics;
  determining that the third characteristics exceed the threshold difference from the first characteristics;
  determining, based at least in part on the third characteristics exceeding the threshold difference, that the third audio clip is distinct from the first audio clip; and
  providing, based at least in part on the third audio clip being distinct from the first audio clip, the third audio clip to the user account.

16. The system of claim 14, the operations further comprising:
  receiving, from the user account, a selection of the second audio clip for inclusion in the content item.

17. The system of claim 14, wherein the machine-learned model is configured to determine a popularity probability associated with an audio clip of the audio track based at least in part on a spectrogram graph associated with the audio track.

18. The system of claim 14, the operations further comprising:
  determining a number of content items that include the audio track; and
  determining that the number of content items that include the audio track is greater than a threshold number,
  wherein providing the first audio clip is further based at least in part on determining that the number of content items that include the audio track is greater than the threshold number.

19. The method of claim 1, further comprising:
  receiving, from the first user account, feedback based at least in part on the first audio clip;
  modifying parameters of the machine-learned model based at least in part on the user feedback;
  selecting, as a selected portion of the audio track, using the machine-learned model and based at least in part on the parameters, the first audio clip or the second audio clip to provide to a second user account; and
  providing the selected audio clip to the second user account for inclusion in a content item.

20. The system of claim 14, the operations further comprising:
  receiving, from the first user account, feedback based at least in part on the first audio clip;
  modifying parameters of the machine-learned model based at least in part on the user feedback;
  selecting, as a selected portion of the audio track, using the machine-learned model and based at least in part on the parameters, the first audio clip or the second audio clip to provide to a second user account; and
  providing the selected audio clip to the second user account for inclusion in a content item.

* * * * *